United States Patent
Ruck

(10) Patent No.: US 6,806,968 B2
(45) Date of Patent: Oct. 19, 2004

(54) APPARATUS AND METHOD FOR MEASURING A WORKPIECE

(75) Inventor: Otto Ruck, Pfahlheim (DE)

(73) Assignee: Carl-Zeiss Stiftung, Heidenheim (DE)

( * ) Notice: Subject to any disclaimer, the term of this patent is extended or adjusted under 35 U.S.C. 154(b) by 0 days.

(21) Appl. No.: 10/281,141

(22) Filed: Oct. 28, 2002

(65) Prior Publication Data

US 2003/0086095 A1 May 8, 2003

Related U.S. Application Data

(63) Continuation of application No. PCT/EP01/03860, filed on Apr. 5, 2001.

(51) Int. Cl.[7] .............................................. G01B 11/24
(52) U.S. Cl. ........................ 356/623; 356/606; 356/3.06
(58) Field of Search ....................... 356/602, 606–609, 356/614–615, 622–623, 3.06–3.08, 501, 508; 702/150, 158; 209/526

(56) References Cited

U.S. PATENT DOCUMENTS

| | | | | |
|---|---|---|---|---|
| 4,326,804 A | * | 4/1982 | Mossey | 356/623 |
| 4,488,648 A | * | 12/1984 | Claypool | 209/526 |
| 4,705,395 A | * | 11/1987 | Hageniers | 356/3.06 |
| 4,858,157 A | | 8/1989 | Murai et al. | |
| 5,381,235 A | * | 1/1995 | Inoue et al. | 356/606 |
| 5,517,311 A | | 5/1996 | Takeuchi et al. | |
| 5,828,584 A | * | 10/1998 | Oda et al. | 702/158 |
| 5,884,239 A | * | 3/1999 | Romanik, Jr. | 702/150 |
| 5,982,491 A | | 11/1999 | Breyer et al. | |
| 6,094,270 A | * | 7/2000 | Uomori et al. | 356/623 |

FOREIGN PATENT DOCUMENTS

| | | |
|---|---|---|
| DE | 43 27 937 | 2/1995 |
| EP | 0 462 289 | 12/1991 |

* cited by examiner

Primary Examiner—Frank G. Font
Assistant Examiner—Sang H. Nguyen
(74) Attorney, Agent, or Firm—Walter Ottesen

(57) ABSTRACT

The invention is directed to an apparatus for measuring a workpiece and includes a coordinate measuring apparatus or a machine tool. The invention further relates to a method for measuring the workpiece using such an apparatus. The apparatus includes a control and evaluation unit (26) and at least one measuring sensor (6) which functions independently of the control and evaluation unit and which can be displaced by a mechanism (27) of the coordinate measuring device in the three coordinate directions (x, y, z) in relation to the workpiece. The apparatus includes timers which are provided both in the measuring sensor (6) and in the control and evaluation unit (28) in order to synchronize the measuring sensor (6) and the control and evaluation unit (28). The timers function independently from each other and are adjusted to a common starting time.

22 Claims, 5 Drawing Sheets

APPARATUS AND METHOD FOR MEASURING A WORKPIECE

RELATED APPLICATIONS

This application is a continuation application of international patent application PCT/EP 01/03860, filed Apr. 5, 2001, and claiming priority from German patent application 100 20 842.8, filed Apr. 28, 2000.

FIELD OF THE INVENTION

The invention relates to an apparatus for measuring such as, for example, a coordinate measuring apparatus or a machine tool which includes a control and evaluation unit and a measuring sensor. The measuring sensor operates independently of said control and evaluation unit and can be displaced with a mechanism along three coordinate directions relative to a workpiece, which is to be measured. The invention further relates to a method for measuring using such an apparatus.

BACKGROUND OF THE INVENTION

Such an apparatus for measuring can, for example, be a coordinate measuring apparatus or a machine tool. The sensors used in such apparatuses are most often optical probes such as, for example, triangulation probes or video cameras, which include evaluation electronics. For a video camera used as a measuring sensor, the system clock rate of the evaluation electronics is defined by the video frequency of the camera. This frequency is significantly greater than the system clock rate of the control unit of a coordinate measuring system or a machine tool, which is optimized to the drive control. A synchronization of the measuring sensor with the control and evaluation unit without additional special measures can only be achieved if an evaluation is made at standstill of the coordinate measuring apparatus or machine tool, since only then the values of the measuring sensor and the machine measuring values of the coordinate measuring apparatus do not vary in time. However, performing a big measuring task in this way requires a tremendous amount of time, since for the recordation of each measuring point the coordinate measuring apparatus has to come completely to standstill.

To overcome this problem, complicated interfaces have been developed between the control and evaluation unit of a coordinate measuring apparatus or machine tool and a measuring sensor functioning independently of such control and evaluation unit.

Such coordinate measuring apparatus is described in U.S. Pat. No. 5,982,491, which is incorporated herein by reference. This United States patent discloses a laser triangulation probe mechanism which functions independently from the coordinate measuring apparatus and can be moved by the mechanics of a coordinate measuring apparatus along the coordinate directions x, y, z for detecting the edges on workpieces. For this purpose, the measuring sensor is guiding a probe beam on a circular scanning line and the coordinate measuring apparatus mechanism guides the measuring sensor perpendicularly over the edge. To synchronize the sensor values of the measuring sensor, which have been evaluated, with the machine measuring values of the scales of the coordinate measuring apparatus, both the coordinate measuring apparatus and the measuring sensor include an interface, which is especially developed for the measuring sensor used. Via this interface, the measuring sensor informs the control unit of the coordinate measuring apparatus on how many electronic cycles ago the measuring sensor was in a defined position with respect to the edge which has been traversed.

SUMMARY OF THE INVENTION

The object of the present invention is to provide an apparatus for measuring having a control and evaluation unit and a measuring sensor, which functions independently from the control and evaluation unit but which can be easily synchronized therewith. It is another object of the invention to provide a method for measuring using such an apparatus.

The apparatus of the invention is for measuring a workpiece and includes: a control and evaluation unit generating machine measuring values ($x_i$, $y_i$, $z_i$) which includes a first timer; a measuring sensor detecting sensor measuring values ($x'_i$, $y'_i$, $z'_i$) and including a second timer; the first and second timers operating independently of each other; the measuring sensor being coupled with the control and evaluation unit; a mechanism operatively connected to the control and evaluation unit for displacing the measuring sensor in three coordinate directions relative to the workpiece in response to the measuring values ($x'_i$, $y'_i$, $z'_i$); and, a synchronizing device for synchronizing the first timer and the second timer.

The method of the invention is for measuring a workpiece using an apparatus including a control and evaluation unit coupled with a measuring sensor and an electromechanical drive mechanism for displacing the measuring sensor in three coordinate directions in relation to the workpiece. The control and evaluation unit includes a first timer and the measuring sensor includes a second timer, the first and the second timer operating independently of each other, the method including the steps of: generating machine measuring values ($x_i$, $y_i$, $z_i$) with the control and evaluation unit; generating the sensor measuring values ($x'_i$, $y'_i$, $z'_i$) with the measuring sensor; and, synchronizing the first timer and the second timer.

The basic concept of this invention is to provide timers in the measuring sensor and in the control and evaluation unit which function independently of each other. The timers are synchronized to a common start time point.

The important advantage of such a coordinate measuring apparatus or machine tool over the prior art is that such coordinate measuring apparatus allows to synchronize in a simple way measuring sensors, which function independently of the coordinate measuring apparatus, with the control and evaluation unit of the coordinate measuring apparatus or the machine tool. In this way, a very simple standard can be provided, which can be taken over by the manufacturers of the corresponding measuring sensors without any big effort. Furthermore, it is also possible to update in a very simple way old measuring sensors, which do not have this standard, just by adding a small program section. This standard provides decisive advantages also for the manufacturers of coordinate measuring apparatuses and machine tools. On the one hand, the often time and cost intensive adaptation of a coordinate measuring apparatus or a machine tool to a specific measuring sensor type hereby is unnecessary. On the other hand, the variety of sensors usable on a coordinate measuring apparatus or a machine tool can be increased considerably.

As a timer in the measuring sensor and in the control and evaluation unit, the timer present in the system having the highest resolution should be used. As an example, this means for a personal computer, the clock counter register for the cycle interrupt source should be used or, for a microprocessor, the time stamp counter register should be used. This is necessary because relatively small time increments are required. The system clock of a personal computer, for example, which provides only for 18 time increments per second, is not sufficiently accurate for this purpose.

The synchronization of the timers to a common starting point can be done in different ways. Most simply, the time values of the timers are read out at a certain time and stored as the start time point. In a preferred embodiment, the timers are synchronized to values, which represent a common clock time. Preferably, the timers should be set to world time as is the case in so-called radio clocks.

To make the running deviations between the timers as small as possible, the timers should be synchronized several times during a measuring sequence at short time intervals to a common start time point.

The time relation of the time values outputted by the timers relative to each other can be determined in a very simple embodiment, in that, at a certain time point after the start point, the common time values of the timers are read out again and the difference of these time values to the corresponding time values at the start time point is determined. The quotient of these differences indicates the ratio of the run time of the timers relative to each other.

Preferably, the timers are normalized to a common time unit such as, for example,sa second. In this way, the time values, which originate from the timer of the measuring sensor can be directly compared to the time values, which originate from the timer of the control and evaluation unit. For normalization, a plurality of different variations is possible. The simplest variation is that the control and evaluation unit as well as the measuring sensor normalize the corresponding timers themselves. This is possible in a simple manner in that the number of cycles of the corresponding timer are counted until the corresponding system clock has advanced by a defined time interval, such as, for example, one second. The time increment per cycle of the timer then results from the time interval divided by the number of cycles counted.

As an alternative, it is also possible, that such normalization is performed by the control and evaluation unit. For example, this could be achieved in that the control and evaluation unit outputs a signal via a trigger line, based on which both the timer in the measuring sensor and the timer in the control and evaluation unit are read out. Then, after the system clock of the control and evaluation unit has advanced by a certain time interval, another signal is outputted via the trigger line and in correspondence to this signal, the timer in the measuring sensor as well as the timer in the control and evaluation unit are read out. The time increment per cycle of the corresponding timer then results in the same way as the time interval divided by the number of cycles counted.

So that the control and evaluation unit can reasonably cooperate with the measuring sensor, the detected measuring values of the measuring sensor are tagged with a time stamp by its timer and transmitted to the control and evaluation unit. Since the control and evaluation unit is synchronized with the measuring sensor via the timers, the sensor measuring values can be adapted in time to the measuring process in the control and evaluation unit at any time.

For example, if the measuring sensor values shall be fed back to the travel path data of the measuring process, it is necessary to adapt the sensor measuring values to the measuring process. For example, this is the case if the surface of a workpiece is to be scanned continuously with a laser triangulation probe. For this purpose, the measuring sensor is guided by the control of the coordinate measuring apparatus over the surface of the workpiece parallel to the surface, whereby the distance of the measuring sensor from the surface is held constant in that the measuring sensor values are fed back to the travel path data so that the mechanism for the measuring sensor corrects the position of the measuring sensor in the corresponding direction.

For this feedback, a dead time is calculated for each sensor measuring value, which results from the time difference between the time stamp of the sensor measuring value and the actual time value of the timer in the control unit. This dead time is of interest for two reasons.

On the one hand, long dead times show that the data transmission line between the measuring sensor and the control and evaluation unit or the measuring sensor itself is working relatively slowly. For this reason, the control and evaluation unit should be designed in a way that the measuring speed of the measuring sequence is reduced the longer the dead time becomes.

As described above, the reason for the feedback is also to maintain a constant distance of the measuring sensor from the surface of the workpiece. The older the measuring sensor value, the smaller the effect on the control correction should be.

For this reason, the control variable should be calculated in a way that, in case the dead time is increasing, the effect of feedback is reduced.

Furthermore, when the sensor measuring values are mathematically processed with the machine measuring values of the control and evaluation unit, the sensor measuring values also have to be adapted to the measuring sequence. That means, the sensor measuring values must be processed with the scale values of the x, y and z direction of the mechanism. For this purpose, the sensor measuring values have to be brought into relationship with the machine measuring values.

In order to achieve this, time stamps are added to the machine measuring values, which were provided by the timer in the control and evaluation unit, so that the time stamps of the sensor measuring values can be compared to the time stamps of the machine measuring values.

By interpolating between sensor measuring values or between machine measuring values, pairs of sensor measuring values and machine measuring values can be determined, which correspond to each other and which then can be processed for determining measuring points.

Furthermore, the sensor measuring values with the time stamps can also be used for correcting the measuring results. Since the time stamps subsequently define the exact time sequence of the sensor measuring values, this time sequence of sensor measuring values can be analyzed and as an example an analysis of oscillations can be made. For example, the sensor measuring values can be Fourier transformed to determine the characteristic oscillations of the coordinate measuring apparatus.

In general, as a coordinate measuring apparatus, any coordinate measuring apparatus can be used, which includes a measuring sensor that can be displaced in the three coordinate directions of the measuring system. Such coordinate measuring apparatus can be a stand measuring apparatus, a portal measuring apparatus, a bridge measuring apparatus or a coordinate measuring apparatus with axes of rotation. The coordinate measuring apparatus can have a numerically controlled drive or can be based on manual control.

In the same way, also a broad variety of machine tools is possible. For example, such machine tool could be a milling machine, which includes a measuring sensor instead of a milling tool.

The same holds for the measuring sensors, which can be of various types. For example, a laser triangulation probe could be used as a measuring sensor or a video camera or an interferometric sensor.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
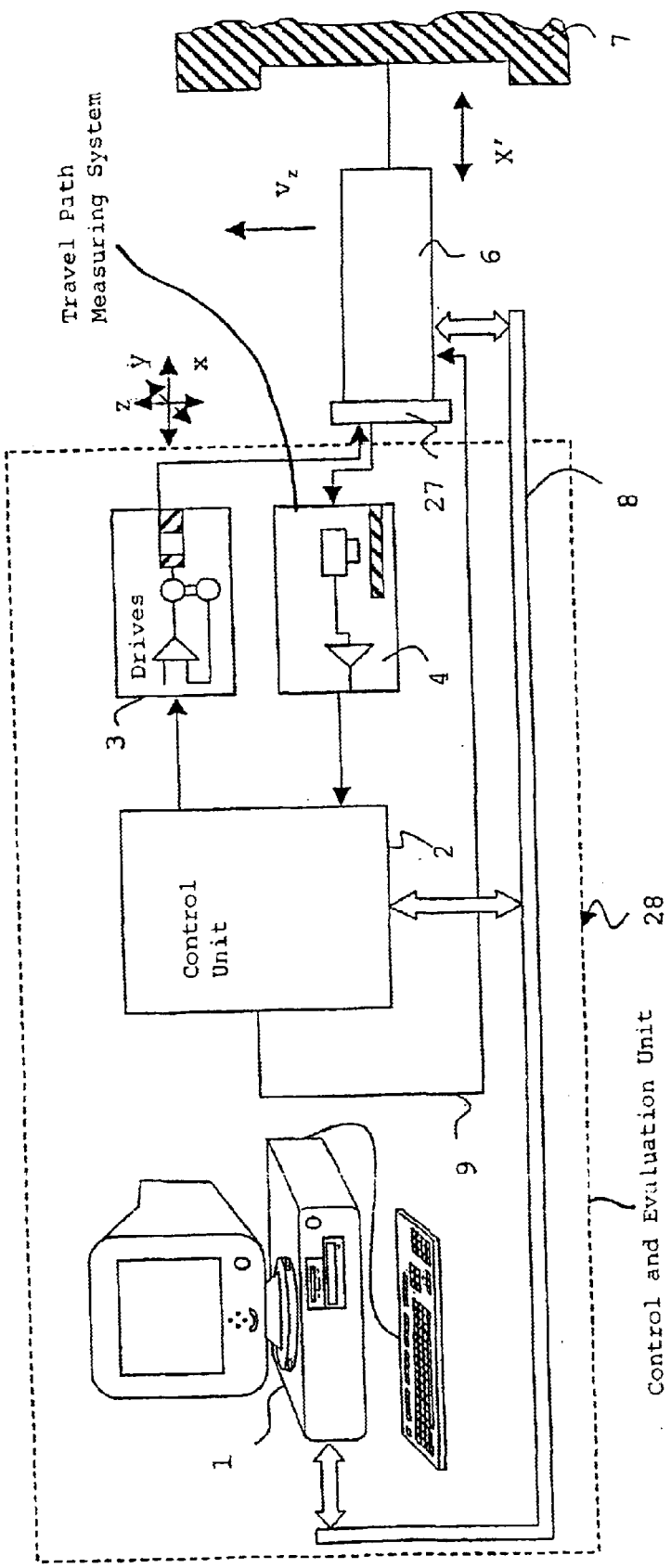
FIG. 1 is a schematic block diagram of a coordinate measuring apparatus of the invention.

FIG. 1 shows a schematic block diagram of a coordinate measuring apparatus of the invention. The coordinate measuring apparatus includes a computer 1, which is connected for communication to a line 8, for example, a LAN or a RS232 with a control unit 2 of the coordinate measuring apparatus and to a measuring sensor 6, which functions independently. The measuring sensor 6 is a laser triangulation sensor, which can measure the distance between the surface of a workpiece 7 and the measuring sensor 6 along the measuring direction x'. The measuring sensor 6 is attached to a mechanism 27, which is only shown schematically and which can be displaced by means of drives 3 along the three coordinate directions x, y, z. The corresponding positions of the measuring sensor 6 along the three coordinate measuring directions x, y, z are designated as machine-measuring values $(x_i, y_i, z_i)$ and are probed utilizing corresponding travel path measuring systems 4 arranged in the corresponding coordinate measuring directions. The measuring machine values $(x_i, y_i, z_i)$ are passed to the control unit 2. Such travel path measuring systems 4 are normally based on incremental scales, which are scanned with an optical sensor.

In the embodiment shown here, the measuring sensor 6 is displaced with the mechanism 27 in the coordinate direction z parallel to the surface of the workpiece 7. Along the coordinate measuring direction x, however, which for simplicity coincides with the measuring direction x' of the measuring sensor 6, the sensor measuring values $x'_i$ on the travel path data in the control unit 2 are fed back in such a way that the sensor measuring values $x'_i$ and so the distance between the measuring sensor 6 and the surface of the workpiece 7 remains more or less constant.

Therefore, the coordinate measuring apparatus has a control and evaluation unit 28, which, in turn, includes a computer 1 and a control unit 2 associated with drives 3 and travel path measuring units 4 as well as a measuring sensor 6. The measuring sensor functions independently from the control and evaluation unit 28 and can be displaced by the mechanism 27 of the coordinate measuring system along the three coordinate measuring directions x, y and z.

As explained above, the control unit 2 functions at a relatively low system cycle rate, which is adapted to the control of the drives 3, while the measuring sensor 6 functions independently therefrom at its own relatively high system cycle rate. So that the control and evaluation unit 28 can purposefully cooperate with the independently functioning measuring sensor 6, the measuring sensor 6 and the control and evaluation unit 28 are synchronized in accordance with the invention as will be explained in detail hereinafter with respect to FIGS. 1 and 2.

Figure 2:
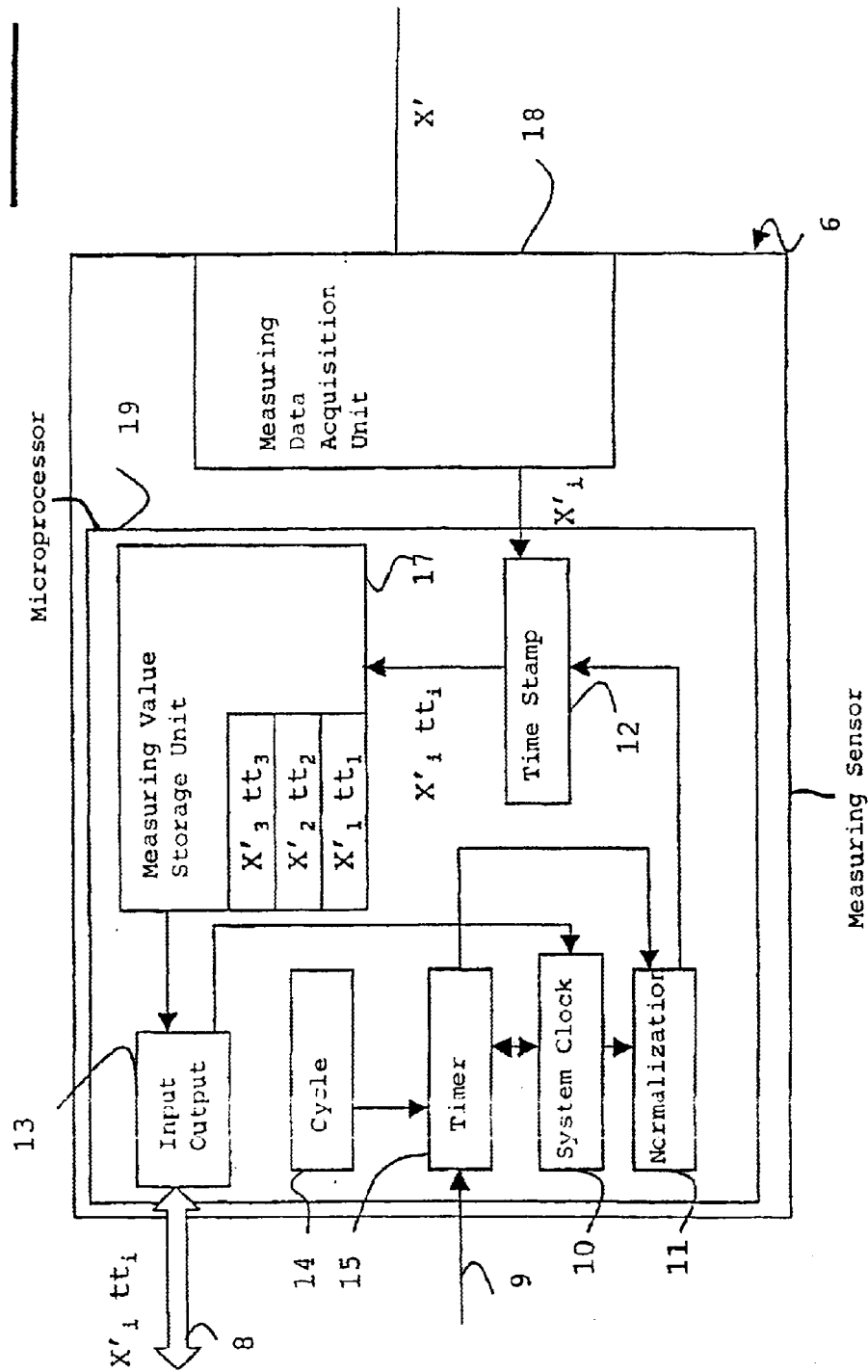
FIG. 2 is a schematic representation of the components of a measuring sensor shown in FIG. 1.

FIG. 2 is a schematic representation of the measuring sensor 6 shown in FIG. 1 and presents all the details which are relevant for this invention. The measuring sensor 6 includes a measuring data acquisition unit 18 which acquires the measuring sensor values $x'_i$ using laser triangulation. This means, the distance between the measuring sensor 6 and the surface of the workpiece 7 is measured. The measuring sensor 6 includes a microprocessor 19, in which the sensor measuring values $x'_i$ are correspondingly processed. The function groups indicated on the microprocessor 19 essentially represent software modules.

Figure 3:
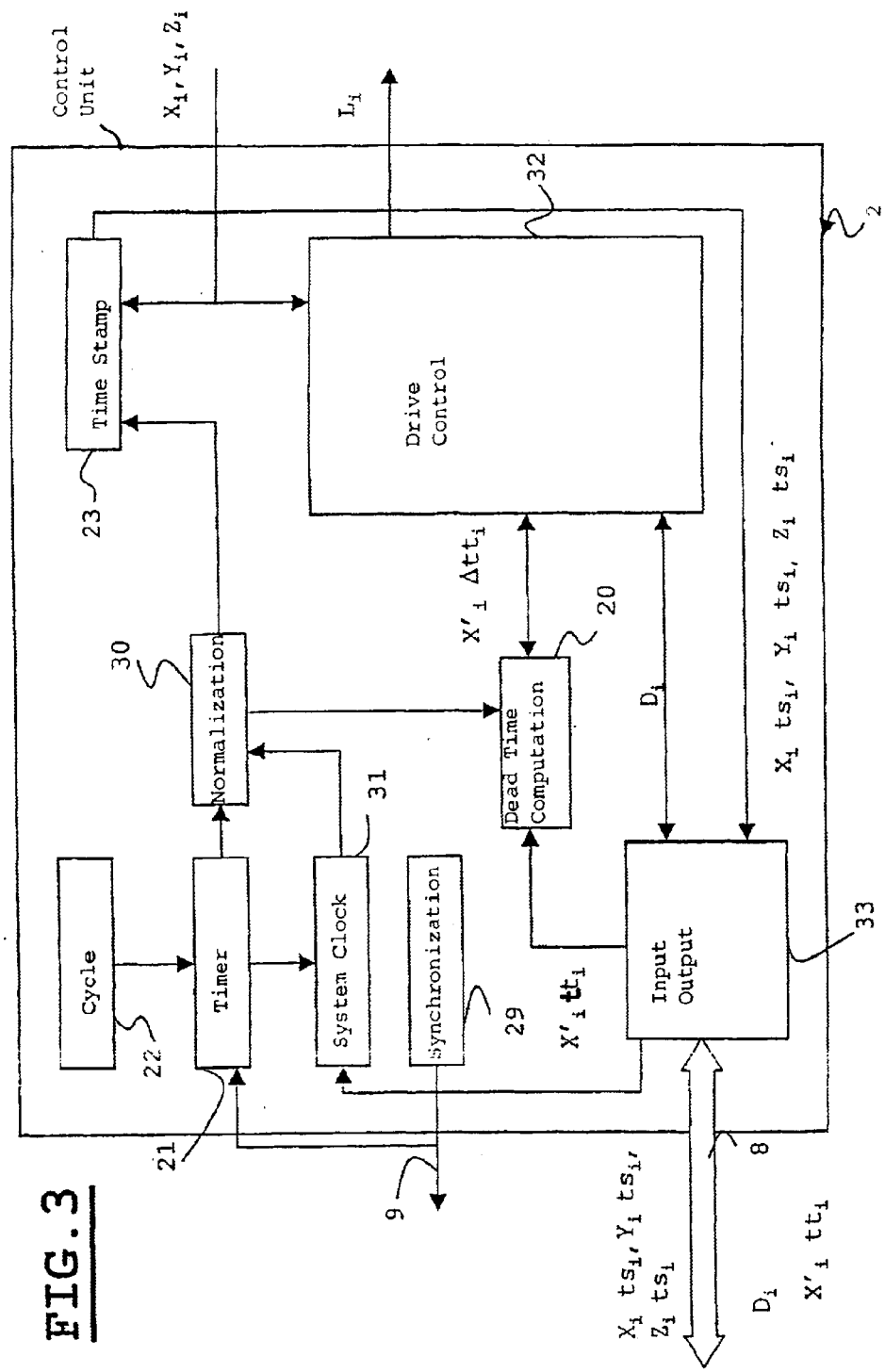
FIG. 3 is a schematic representation of the essential components of a control unit shown in FIG. 1.

FIG. 3 is a schematic representation of the control unit 2 shown in FIG. 1, which includes all the details relevant for this invention. The control unit 2 is configured as a single microprocessor, and the function groups indicated are correspondingly realized as software modules.

The essential function groups through which the measuring sensor 6 and the control and evaluation unit 28 are synchronized include a timer 15, which is provided in the measuring sensor 6, and a timer 21, which is included in the control unit 2. These timers are chosen from among the available timers having the highest resolution possible, that means they represent the time stamp counter register of the microprocessor 19 of the measuring sensor 6 and correspondingly the time stamp counter register of the microprocessor of the control unit 2. In these registers, the number of the cycle flanks of the corresponding cycle (14 or 22) of the corresponding microprocessor as counted from a starting value is stored. The content of these registers functions as a high resolution basis for the corresponding system clock (10 or 31) of the corresponding microprocessor.

In addition, the control unit 2 includes a synchronization unit 29, which synchronizes the two timers (15 and 21) to a common starting time point.

In the embodiment shown here, synchronization is achieved in that the system clock 31 (and therefore the timer 21 in the control unit 2) and the system clock 10 (and therefore the timer 15 in the microprocessor 19 of the measuring sensor) are set to a common clock time. This is done via the line 8 between the control unit 2 and the measuring sensor 6. A start pulse is given to the timers (15 and 21) via a trigger line 9 in response to which the two timers (15 and 21) start running with the time set previously. As a consequence, the system clocks 10 and 31 run in a more or less synchronous way, so that the exact point of time can be determined from the value of the corresponding timer (15 or 21). This is possible in a simple way, in that for each timer (15 or 21), the corresponding number of cycle flanks is counted by which the value of the timer at a certain time is changed.

So that the time values of the timers can be directly compared with each other, a normalization unit (11 or 30) is provided both in the measuring sensor 6 and in the control 2, which normalizes the time outputted by the corresponding timer (15 or 21) to a common time basis, preferably to one second. The corresponding normalization unit (11 or 30) continuously counts the number of cycles until the system clock 31 in the control unit 2 or, in an analogous way, the system clock 10 in the measuring sensor 6, have advanced by one second. The time increment per cycle of the corresponding timer (15 or 21) then is one second divided by the counted number of cycles. In this way, a normalized time value of the corresponding timer (15 or 21) is provided.

It will now be shown in detail with reference to FIGS. 2 to 6 how the measuring sensor 6 and the control and evaluation unit 28 coact in a measuring sequence. The measuring sensor 6 and the control and evaluation unit 28 are synchronized by the timers 15 and 21.

For this, as can be seen from FIG. 2, the sensor measuring values $x'_i$, which are acquired by the measuring data acquisition unit 18 and are passed to the microprocessor 19, are given to a time stamp unit (12), which attaches the actual normalized time value of the timer 15 in form of a digital time stamp $tt_i$ to the sensor measuring values $x'_i$ and stores these sensor measuring values $x'_i$ together with the time stamps $tt_i$ in a measuring value storage unit 17. On command of the control unit 2, the stored measuring values $x'_i$ together with the corresponding time stamps $tt_i$ are then transmitted at certain time intervals to the control unit 2 as well as to the computer 1 of the control and evaluation unit 28 via the function group "input/output unit 13" and the line 8. In this context, it is noted that the index "i" herein is an integer number.

The feedback of the sensor measuring values $x'_i$ to the travel path data of the measuring sequence in the control unit 2 now is explained in detail with respect to FIG. 3. The function of the control unit 2 for performing the measuring process without feedback is first explained. For this, data $D_i$, which define the measuring sequence, are transmitted from the computer 1 via line 8 to the function unit 33 "input/output", which passes these data $D_i$ to the function unit 32 "drive control". Here, the data $D_i$ are transformed into travel path data in form of desired position values $L_i$, which, at constant cycle, are passed to the drives 3 of the coordinate measuring apparatus. These desired position values $L_i$ define the position to which the measuring sensor 6 is to be moved in the x, y, z direction. From the travel path measuring system 4 of the mechanism 27, machine measuring values $x_i$, $y_i$, $z_i$ are, in turn, provided, which represent the actual position of the measuring sensor 6 in the coordinate measuring directions x, y, z. These machine measuring values $x_i$, $y_i$, $z_i$ are passed, inter alia, to the drive control 32. Here, a comparison of actual values with the desired position values $L_i$ is made and the deviation is fed back to the drives 3 for control correction.

Furthermore, the sensor measuring values $x'_i$ are fed back to the travel path data of the corresponding measuring sequence. For this purpose, the sensor measuring values $x'_i$, which are received from the function group 33 "input/output" in the control unit 2 and are transmitted via the line 8, are passed to a dead time computation unit 20 together with the corresponding time stamps $tt_i$. There, the feedback dead time $\Delta tt_i$ is computed. More specifically, the time difference is computed between the time stamps $tt_i$ and the corresponding actual time value of the timer 21 which is provided normalized by the normalization unit 30. These dead times $\Delta tt_i$ indicate how "old" the corresponding sensor measuring values are with respect to the present time point.

The sensor measuring values $x'_i$ then are fed back to the desired position values $L_i$ in two ways.

Figure 5:
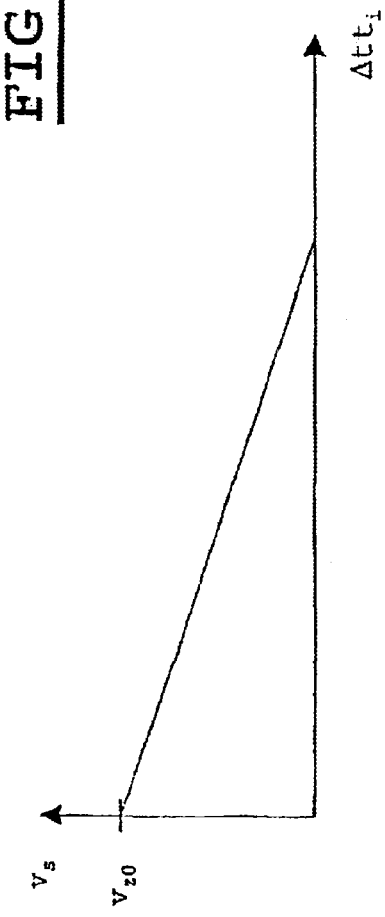
FIG. 5 schematically illustrates the interdependence of the measuring speed (Vs) and the dead time; and, FIG. 6 schematically illustrates the relationship of the sensor measuring values and the machine measuring values.

On the one hand, the dead time $\Delta tt_i$ is fed back to the measuring speed $V_s$ in a way that when the dead time $\Delta tt_i$ becomes longer, the measuring speed $V_s$ of the measuring sequence is reduced. As explained above, long dead times indicate that either the data transmission path between the sensor 6 and the control unit 2 is relatively slow or that the measuring sensor 6 supplies measuring values only at a relatively low rate. FIG. 5 shows how the measuring speed $V_z$ changes in dependence upon the dead time. As shown, the measuring speed $V_s$ varies in dependence upon the dead time $\Delta tt_i$ between the values $v_{z0}$ and zero.

On the other hand, the sensor measuring values $x'_i$ are fed back to the travel path data of the measuring sequence in such a way that the drives 3 adjust the position of the measuring sensor 6 so that the distance between the measuring sensor 6 and the surface of the workpiece 7 remains more or less constant. The control is designed in such a way that the effectiveness of the feedback is reduced when the dead time $\Delta tt_i$ becomes longer. That means that the "older" measuring values have a lesser effect on the feedback than the "younger" or more recent measuring values. This functionality is achieved by a weighing in dependence upon the determined dead time $\Delta tt_i$.

In addition to the feedback of the sensor measuring values $x'_i$ to the travel path data, the measuring sensor 6 also cooperates with the control and evaluation unit 28 in that, for evaluating the measuring data in the computer 1, the sensor measuring values $x'_i$ and the machine measuring values $x_i$, $y_i$ and $z_i$ are computed together. In this way, the individual measuring points on the surface of the workpiece 7 are calculated. To evaluate measuring data, the machine measuring values ($x_i$, $y_i$, $z_i$) from the measuring data acquisition unit 4 are first passed to a time stamp unit 23 in the control unit 2, which puts a time stamp on the machine measuring values ($x_i$, $y_i$, $z_i$) in the form of a digital time stamp $ts_i$ in the same manner as in the case of the sensor measuring values. Same as the sensor measuring value $x'_i$, the machine measuring values ($x_i$, $y_i$, $z_i$), which are tagged with the time stamps, are transmitted via the function group "input/output" and the line 8 to the computer 1.

Figure 4:
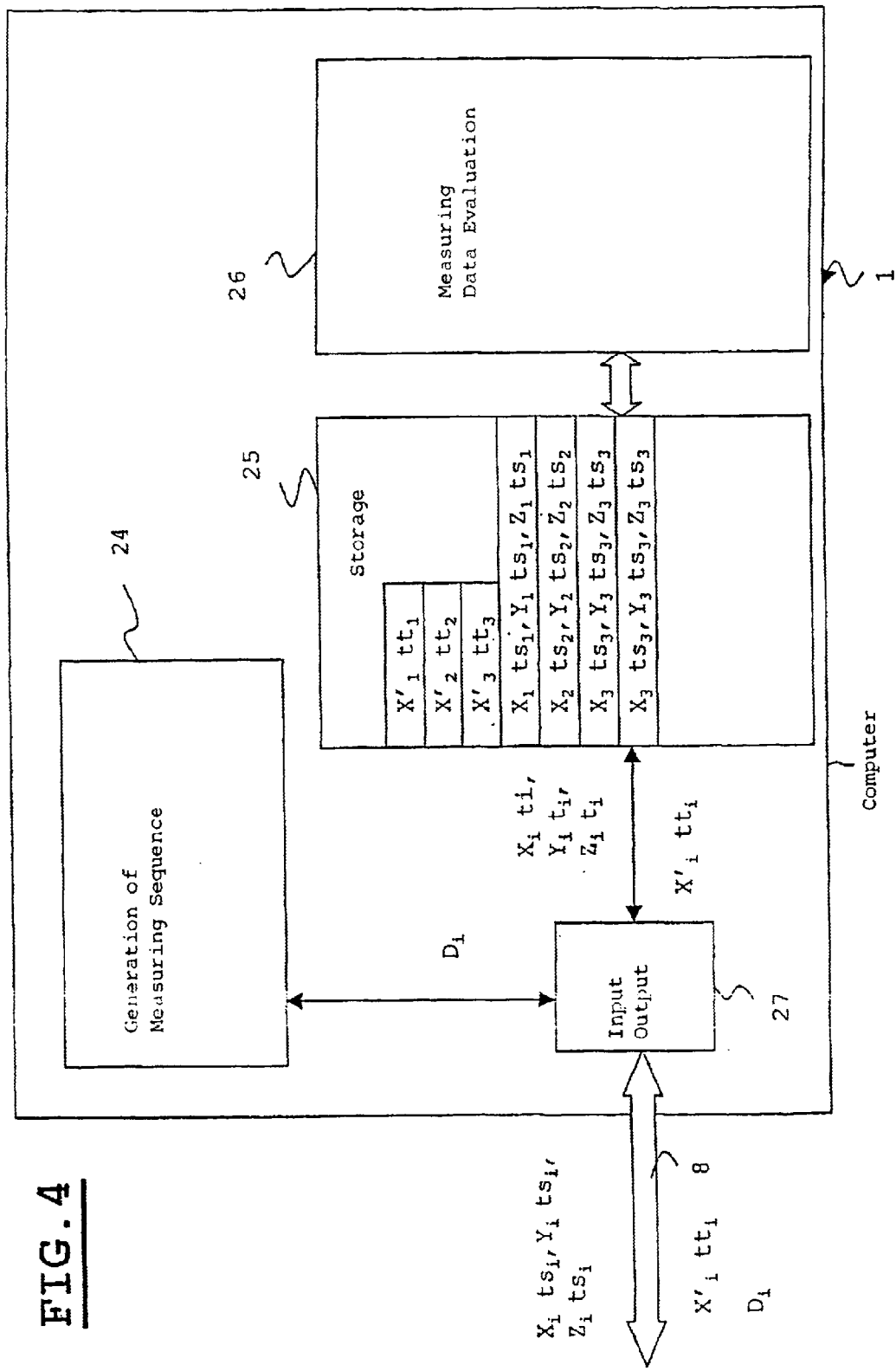
FIG. 4 is a schematic representation of the essential components of a computer shown in FIG. 1.

The measuring data evaluation in the computer 1 now is described with reference to FIG. 4 wherein the components of the computer 1 are shown schematically. Essentially, these components are software modules. As shown, function group unit 27 "input/output" receives the machine measuring values ($x_i$, $y_i$, $z_i$) including the corresponding time stamps $ts_i$ and the sensor measuring values $x'_i$ with the corresponding time stamps $tt_i$ via the line 8. These data are then first stored in storage 25 and then evaluated in unit 26 "measuring data evaluation", as explained with respect to FIG. 4.

Figure 6:
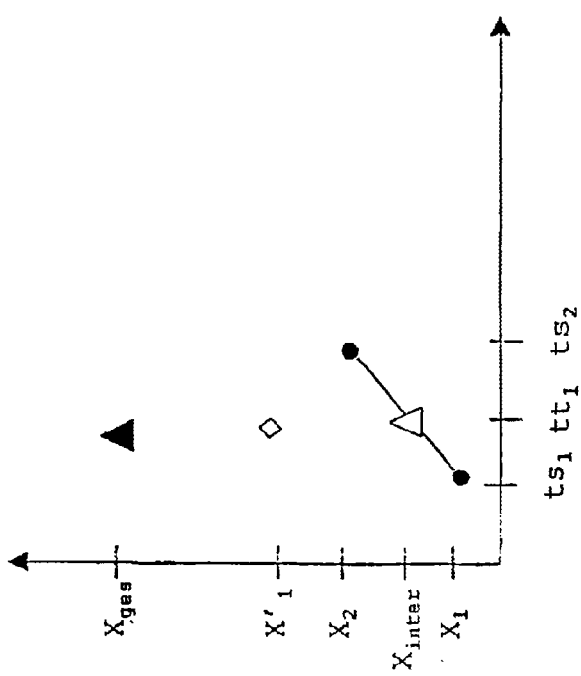

For computing the individual measuring points on the surface of the workpiece 7, the correct components of the sensor measuring values $x'_i$ and the machine measuring values ($x_i$, $y_i$, $z_i$) have to be added. Because the sensor measuring values $x'_i$ and the machine measuring values ($x_i$, $y_i$, $z_i$) have not been detected at the same time, they first have to be related in time and in space, as it is shown for the x coordinate measuring direction in FIG. 6. As can be seen in FIG. 6, there are two machine measuring values $x_1$ and $x_2$, which are assigned time stamps $ts_1$ and $ts_2$, respectively. In time between these two machine measuring values $x_1$ and $x_2$, the sensor measuring values $x'_1$ having the time stamp $tt_i$ was acquired. From comparing the time stamps $ts_1$ and $ts_2$ of the machine measuring values $x_1$ and $x_2$ and the time stamp $tt_1$ of the measuring value $x'_1$, the machine measuring values $x_1$ and $x_2$ and the sensor measuring value $x'_1$ can be placed in time relationship to each other. By interpolation between the machine measuring values $x_1$ and $x_2$, an interpolated machine measuring value $x_{inter}$ can be determined, which would have been present at time $tt_1$. In this way, pairs ($x_{inter}$, $x'_1$) of sensor measuring values and machine measuring values can be computed which correspond in time and therefore correspond also in space to each other. The interpolated machine measuring value $x_{inter}$ and the sensor measuring value $x'_1$ now can be added, so that the total measuring value $x_{ges}$ for the particular coordinate direction can be calculated by addition. This method is carried out in the same way for the other coordinate directions.

The function group unit 26 "measuring data evaluation" furthermore can, based on the sequence of the sensor measuring values as defined by the time stamps, perform analyses such as, for example, an oscillation analysis for the correction of measuring values.

As can be seen here, the basic principle of this invention has been explained using a very simple example. This example may be varied in various ways. For example it is not necessary to interpolate the machine measuring values. For example, same as the machine measuring values, the sensor measuring values could be interpolated. Furthermore, it is also not necessary that the measuring sensor is aligned along a coordinate direction. For example, the sensor could also be attached on a so-called rotation pivoting unit, which has two perpendicular axes of rotation, so that the measuring sensor 6 can be rotated in any desired direction in space. Instead of a laser triangulation probe, a variety of other probes could be used. For example, a video camera could be used for measuring the surface of a workpiece in two dimensions parallel to the workpiece surface.

It is understood that the foregoing description is that of the preferred embodiments of the invention and that various changes and modifications may be made thereto without departing from the spirit and scope of the invention as defined in the appended claims.

What is claimed is:

1. An apparatus for measuring a workpiece, the apparatus comprising:
   a control and evaluation unit generating machine measuring values ($x_i$, $y_i$, $z_i$) and said unit including a first timer;
   a measuring sensor detecting sensor measuring values ($x'_i$, $y'_i$, $z'_i$) and said measuring sensor including a second timer;
   said first and second timers operating independently of each other;
   said measuring sensor being coupled with said control and evaluation unit;
   an electromechanical mechanism operatively connected to said control and evaluation unit for displacing said measuring sensor in three coordinate directions relative to said workpiece in response to said measuring values ($x'_i$, $y'_i$, $z'_i$); and,
   a synchronizing device for synchronizing said first timer and said second timer.

2. The apparatus of claim 1, further comprising a normalization unit which normalizes said first timer and said second timer to a common time unit.

3. The apparatus of claim 1, wherein said measuring sensor includes means for assigning a time stamp ($tt_i$) of said second timer to said sensor measuring values ($x'_i$, $y'_i$, $z'_i$); and, said measuring sensor passes said sensor measuring values ($X'_i$, $y'_i$, $z'_i$) and said time stamp ($tt_i$) to said control and evaluation unit.

4. The apparatus of claim 3, wherein said control and evaluation unit feeds back said sensor measuring values ($x'_i$, $y'_i$, $z'_i$) to travel path data of a measuring sequence.

5. The apparatus of claim 4, wherein said control and evaluation unit computes a dead time ($\Delta tt_i$) for feedback; said dead time ($\Delta tt_i$) is the rime difference between said time stamp ($tt_i$) and an instantaneous time value of said first timer; and, when dead Lime ($\Delta tt_i$) becomes longer, the effectiveness of said feedback is reduced and/or the measuring speed ($V_s$) of said measuring sequence is reduced.

6. The apparatus of claim 3, wherein said sensor measuring values ($X'_i$, $y'_i$, $z'_i$) and said machine measuring values ($x_i$, $y_i$, $z_i$) are set into relationship with each other with respect to time by said control and evaluation unit.

7. The apparatus of claim 6, wherein said control and evaluation unit relates said sensor measuring values $x'_i$, $y'_i$, $z'_i$) and said machine measuring values ($x_i$, $y_i$, $Z_i$, in time by providing time stamps ($ts_i$) from said first timer for said machine measuring values ($x_i$, $y_i$, $z_i$); and, by comparing said time stamps ($tt_i$) of said sensor measuring values ($x'_i$, $y'_i$, $z'_i$); to said time stamps ($ts_i$) of said machine measuring values.

8. The apparatus of claim 7, wherein said control and evaluation unit computes pairs ($x_{inter}$, $x'_1$) of sensor measuring values and machine measuring values, which correspond to each other in time, from the sensor measuring values ($x'_i$, $y'_i$, $z'_i$) and said machine measuring values ($x_i$, $y_i$, $z_i$) using interpolation.

9. The apparatus of claim 7, wherein said control and evaluation unit adds corresponding coordinate components of said sensor measuring values ($x'_i$, $y'_i$, $z'_i$) and said machine measuring values ($x_i$, $y_i$, $z_i$) for determining measuring points ($x_{ges}$).

10. The apparatus of claim 3, wherein said control and evaluation unit analyzes a sequence of sensor measuring values as defined by said time stamps for correcting said measuring values.

11. A method for measuring a workpiece using an apparatus including a control and evaluation unit coupled with a measuring sensor and an electromechanical drive mechanism for displacing said measuring sensor in three coordinate directions in relation to said workpiece, said control and evaluation unit including a first timer and said measuring sensor including a second timer, said first and said second timer operating independently of each other, the method comprising the steps of:
   generating machine measuring values ($x_i$, $y_i$, $z_i$) with said control and evaluation unit;
   generating said sensor measuring values ($x'_i$, $Y'_i$, $z'_i$) with said measuring sensor; and,
   synchronizing said first timer and said second timer.

12. The method of claim 11, further comprising the step of normalizing said first timer and said second timer to a common time unit.

13. The method of claim 11, wherein said measuring sensor assigns a time stamp ($tt_i$) to said sensor measuring values ($x'_i$, $y'_i$, $z'_i$) which is provided by said second timer; and, said measuring sensor passes said sensor measuring values ($x'_i$, $y'_i$, $z'_i$) and said time stamp ($tt_i$) to said control and evaluation unit.

14. The method of claim 13, wherein said sensor measuring values ($x'_i$, $y'_i$, $z'_i$) are fed back to travel path data of a measuring sequence.

15. The apparatus of claim 14, wherein said control and evaluation unit computes a dead time ($\Delta tt_i$) for feedback; said dead time ($\Delta tt_i$) is the time difference between said time stamp ($tt_i$) and an instantaneous time value of said first timer; and, when dead time ($\Delta tt_i$) becomes longer, the effectiveness of said feedback is reduced and/or the measuring speed ($V_s$) of said measuring sequence is reduced.

16. The method of claim 13, wherein said sensor measuring values ($x'_i$, $y'_i$, $z'_i$) and said machine measuring values ($x_i$, $y_i$, $z_i$) are related in time by said control and evaluation unit.

17. The method of claim 16, wherein said control and evaluation unit relates said sensor measuring values ($x'_i$, $y'_i$, $z'_i$) and said machine measuring values ($x_i$, $y_i$, $z_i$) in time by providing time stamps ($ts_i$) from said first timer for said machine measuring values ($x_i$, $y_i$, $z_i$); and, by comparing said time stamps ($ts_i$) of said sensor measuring values ($x'_i$, $y'_i$, $z'_i$) with said time stamps ($ts_i$) of said machine measuring values ($x_i$, $y_i$, $z_i$).

18. The method of claim 17, wherein said control and evaluation unit calculates pairs ($x_{inter}$, $x'_1$,) of sensor measuring values and machine measuring values, which correspond to each other in time in relating said sensor measuring values ($x'_i$, $y'_i$, $z'_i$) and said machine measuring values ($x_i$, $y_i$, $z_i$) using interpolation.

19. The method of claim 17, wherein said control and evaluation unit adds corresponding coordinate components of said sensor measuring values and said machine measuring values for determining measuring points ($x_{ges}$).

20. The method of claim 11, wherein said control and evaluation unit analyzes a sequence of sensor measuring values as defined by said time stamps for correcting said measuring values.

21. An apparatus for measuring a workpiece, the apparatus comprising:

a control and evaluation unit;

a measuring sensor operating independently of said control and evaluation unit;

an electromechanical mechanism operatively connected to said control and evaluation unit for displacing said measuring sensor in three coordinate directions (x, y, z) relative to said workpiece;

a first timer mounted in said control and evaluation unit and a second timer mounted in said measuring sensor for synchronizing said measuring sensor and said control and evaluation unit;

said first and second timers operating independently of each other; and, a synchronizing device for synchronizing said first timer and said second timer to a common start time point.

22. A method for measuring a workpiece using an apparatus including a control and evaluation unit coupled with a measuring sensor and an electromechanical drive mechanism for displacing said measuring sensor in three coordinate directions (x, y, z) in relation to said workpiece, the method comprising the steps of:

providing a first timer in said control and evaluation unit and a second timer in said measuring sensor with said first and second timers operating independently of each other; and, synchronizing said first timer and said second timer to a common start time point.

* * * * *

UNITED STATES PATENT AND TRADEMARK OFFICE
CERTIFICATE OF CORRECTION

PATENT NO. : 6,806,968 B2
DATED : October 19, 2004
INVENTOR(S) : Otto Ruck

It is certified that error appears in the above-identified patent and that said Letters Patent is hereby corrected as shown below:

Column 3,
Line 26, delete "example, sa" and substitute -- example, a -- therefor.

Column 5,
Line 39, delete "machine.-" and substitute -- machine -- therefor.

Column 8,
Line 58, delete "ts$_i$;" and substitute -- ts$_1$ -- therefor.

Column 9,
Line 61, delete "(X'$_i$, y'$_i$, z'$_i$)" and substitute -- (x'$_i$, y'$_i$, z'$_i$) -- therefor.

Column 10,
Line 1, delete "rime" and substitute -- time -- therefor.
Line 3, delete "Lime" and substitute -- time -- therefor.
Line 7, delete "(X'$_i$, y'$_i$, z'$_i$)" and substitute -- (x'$_i$, y'$_i$, z'$_i$) -- therefor.
Line 10, delete "x'$_i$, y'$_i$," and substitute -- (x'$_i$, y'$_i$, -- therefor.
Line 11, delete "(x'$_i$, y'$_i$, z'$_i$," and substitute -- (x'$_i$, y'$_i$, z'$_i$) -- therefor.
Line 15, delete "z'$_i$);" and substitute -- z'$_i$) -- therefor.
Line 42, delete "(x'$_i$, Y'$_i$, z'$_i$)" and substitute -- (x'$_i$, y'$_i$, z'$_i$) -- therefor.

Column 11,
Line 10, delete "(x$_{inter}$, x'$_1$,)" and substitute -- (x$_{inter}$, x'$_1$) -- therefor.

Signed and Sealed this

Eighth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,806,968 B2
DATED : October 19, 2004
INVENTOR(S) : Otto Ruck

It is certified that error appears in the above-identified patent and that said Letters Patent is hereby corrected as shown below:

<u>Title page,</u>
Insert Item -- [30] Foreign Application Priority Data
April 28, 2000 (DE) ………………….. 100 20 842 --.

Signed and Sealed this

Seventh Day of June, 2005

JON W. DUDAS
*Director of the United States Patent and Trademark Office*